US008032497B2

(12) United States Patent
Adamache et al.

(10) Patent No.: US 8,032,497 B2
(45) Date of Patent: Oct. 4, 2011

(54) METHOD AND SYSTEM PROVIDING EXTENDED AND END-TO-END DATA INTEGRITY THROUGH DATABASE AND OTHER SYSTEM LAYERS

(75) Inventors: Blair K. Adamache, Toronto (CA); Kenneth Wayne Boyd, Tucson, AZ (US); Robert Frederic Kern, Otter Rock, OR (US); Jeffrey William Palm, Rochester, MN (US); Mark Francis Wilding, Barrie (CA)

(73) Assignee: International Business Machines Corporation, Armonk, NY (US)

( * ) Notice: Subject to any disclaimer, the term of this patent is extended or adjusted under 35 U.S.C. 154(b) by 1042 days.

(21) Appl. No.: 11/862,166

(22) Filed: Sep. 26, 2007

(65) Prior Publication Data

US 2009/0083853 A1 Mar. 26, 2009

(51) Int. Cl.
*G06F 7/00* (2006.01)
*G06F 17/30* (2006.01)
(52) U.S. Cl. .................. 707/687; 707/697; 707/699
(58) Field of Classification Search .............. 707/687, 707/689, 697, 699, 690
See application file for complete search history.

(56) References Cited

U.S. PATENT DOCUMENTS

| | | | |
|---|---|---|---|
| 4,420,819 A | 12/1983 | Price et al. | |
| 5,504,861 A | 4/1996 | Crockett et al. | |
| 5,557,742 A | 9/1996 | Smaha et al. | |
| 5,588,012 A | 12/1996 | Oizumi | |
| 5,720,029 A | 2/1998 | Kern et al. | |
| 5,734,818 A | 3/1998 | Kern et al. | |
| 5,914,971 A | 6/1999 | Carter et al. | |
| 6,044,444 A | 3/2000 | Ofek | |
| 6,173,377 B1 | 1/2001 | Yanai et al. | |
| 6,631,480 B2 | 10/2003 | Zeigler et al. | |
| 6,711,180 B1 * | 3/2004 | Delesalle et al. | 370/474 |
| 6,732,122 B2 | 5/2004 | Zoltan | |
| 6,745,310 B2 | 6/2004 | Chow et al. | |
| 6,874,104 B1 | 3/2005 | Josten et al. | |
| 7,035,840 B2 * | 4/2006 | Nakos et al. | 1/1 |
| 7,039,656 B1 | 5/2006 | Tsai et al. | |
| 7,096,392 B2 | 8/2006 | Sim-Tang | |

(Continued)

FOREIGN PATENT DOCUMENTS

WO 2004066082 8/2004

OTHER PUBLICATIONS

"Input/Output Event Analysis", IBM Technical Disclosure Bulletin, vol. 40, No. 07, Jul. 1997, pp. 117-128.

(Continued)

*Primary Examiner* — Don Wong
*Assistant Examiner* — Merilyn Nguyen
(74) *Attorney, Agent, or Firm* — Patterson & Sheridan, LLP

(57) ABSTRACT

Providing extended or end-to-end data integrity through layers of a system. In one aspect, information is to be transmitted between an application end of the system and a physical storage medium that stores the information for a database of the system, the information to be transmitted via a database server in a database server layer of the system. At least a portion of data protection is provided for the information, the data protection causing the information to be protected from corruption between a system layer and the physical storage medium, where the system layer is a separate layer provided closer to the application end of the system than the database server layer.

25 Claims, 4 Drawing Sheets

U.S. PATENT DOCUMENTS

Figure 2:
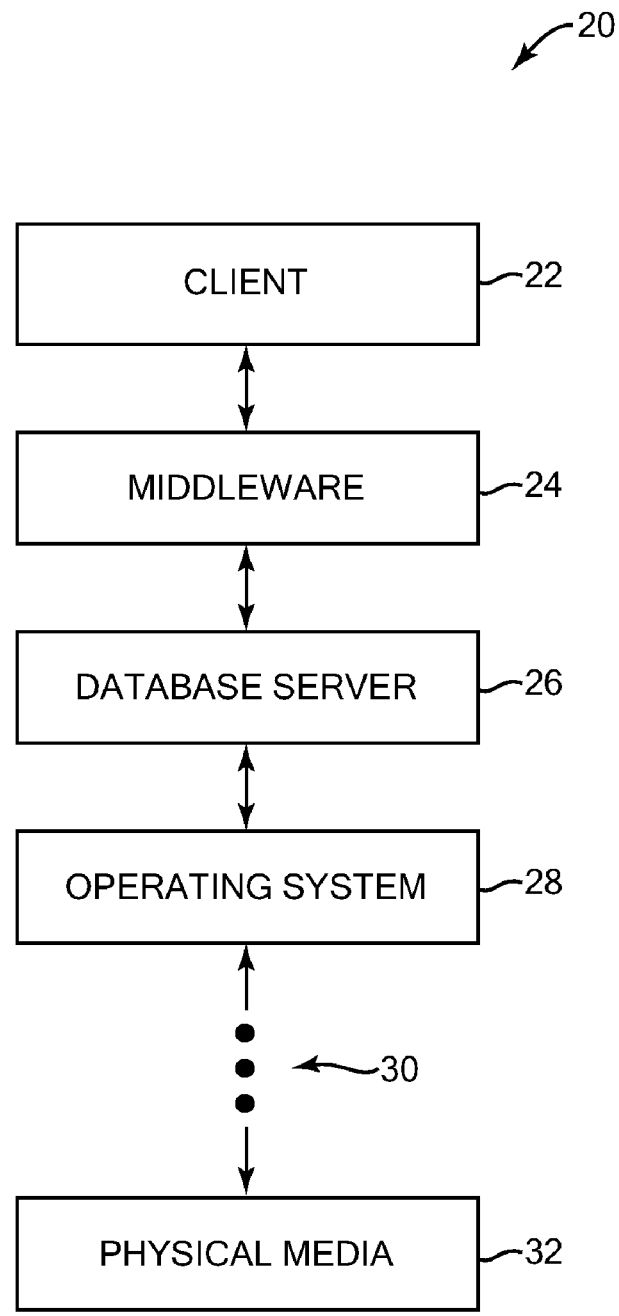

| | | | |
|---|---|---|---|
| 7,111,228 | B1 | 9/2006 | Ricci |
| 7,173,936 | B1* | 2/2007 | Semaan ............... 370/395.51 |
| 7,467,168 | B2 | 12/2008 | Kem et al. |
| 7,610,459 | B2 | 10/2009 | Boyd et al. |
| 7,613,888 | B2 | 11/2009 | Boyd et al. |
| 7,747,583 | B2* | 6/2010 | Margolus et al. ............ 707/689 |
| 7,814,074 | B2* | 10/2010 | Anglin et al. ................ 707/692 |
| 2005/0086529 | A1 | 4/2005 | Buchsbaum |
| 2005/0203881 | A1 | 9/2005 | Sakamoto et al. |
| 2007/0038913 | A1* | 2/2007 | Allen et al. .................. 714/758 |
| 2007/0073519 | A1 | 3/2007 | Long |
| 2007/0271468 | A1 | 11/2007 | McKenney et al. |
| 2008/0016300 | A1 | 1/2008 | Yim et al. |

OTHER PUBLICATIONS

How Much Information? 2003, Executive Summary, 1 Page.

"SCSI Storage Interfaces", incits Technical Committee, http://www.t10.org, Jul. 30, 2007, 2 Pages.

Zhang, Chang N., et al., "An Efficient Authentication Scheme with Fault Tolerance for Database Systems," Computer Society, Proceedings of the Third International Conference on Information Technology and Applications (ICITA), 2005 IEEE, 6 pages.

Huang, Kuang-Hua, "Algorithm-Based Fault Tolerance for Matrix Operations," IEEE Transaction on Computers, vol. C-33, No. 6, Jun. 1984, pp. 518-528.

Sybase iAnywhere, "SQL Anywhere 10 Changes and Upgrading," Publisher Sybase iAnywhere, Oct. 2006, 374 pages.

Thomas Hardjono et al., "A New Approach to Database Authentication" (Extended Abstract), Centre of Computer Security Research, Nov. 18, 1991, Wollongong, NSW 2500, Australia.

Kazuo Taguchi et al., "Extended Data Management System (EDMS)", Database Engineering, Mar. 1983, pp. 13-16, Systems Engineering Department, Mitsubishi Electric Corporation, vol. 6, n1, Tokyo, Japan.

Daniel Barbara et al., "A Checksum-Based Corruption Detection Technique," Journal of Computer Security, 2003, pp. 315-329, vol. 11, n3, IOS Press, Netherlands.

Daniel Barbara et al., "Using Checksums to Detect Data Corruption," Advances in Database Technology, 2000, vol. 1777, Springer-Verlag, Berlin, Germany.

D.E. Denning, "Cryptographic Checksums for Multilevel Database Security," Proceedings of the 1984 Symposium on Security and Privacy, 1984, pp. 52-61, IEEE Computer Society Press, Silver Spring, US.

Wilding et al., Maintain Owning Application Information of Data for a Data Storage System, U.S. Appl. No. 11/734,097, filed Apr. 11, 2007, IBM Corporation.

Wilding et al., Maintain Owning Application Information of Data for a Data Storage System, U.S. Appl. No. 11/734,059, filed Apr. 11, 2007, IBM Corporation.

* cited by examiner

| DOMAIN | SCSI NEXUS | LAYER | CLASS | | |
|---|---|---|---|---|---|
| | | | BLOCK | ADDR | LOSS |
| OS (STORAGE CLIENT) | | APPLICATION | X | | |
| | | SERVER OS / MEMORY | X | X | |
| | | FILE SYSTEM | | X | |
| | | LVM (LOG. VOL. MANAGER) | | X | |
| | | MPIO (MULTIPATH I/O) | | X | |
| | | PERIPHERAL DRIVER | | X | |
| | SCSI ITL NEXUS 1 | SCSI PROTOCOL | | X | |
| | | VIRTUAL SCSI ADAPTER | | X | |
| | | PHYP (POWER HYPERVISOR) | | X | |
| VIOS | | VSCSI | | X | |
| | | LVM (OPTIONAL) | | X | |
| | | PERIPHERAL DRIVER | | X | |
| | | MPIO | | X | |
| | SCSI ITL NEXUS 2 | SCSI PROTOCOL | | X | |
| | | HBA DISK DRIVE | | X | |
| | | SYSTEM BUS & FIRMWARE | X | X | |
| | | HBA (HOST BUS ADAPTER) | X | X | |
| SAN | | SAN (STORAGE AREA NETW) | X | X | |
| | | SAN FABRIC (HW) | X | X | |
| | | SAN LINK | X | X | |
| STORAGE | | HBA | X | X | |
| | | HBA DEVICE DRIVER (DD) | | X | |
| | | SCSI PROTOCOL | | X | |
| | | CONTROLLER HW/SW | X | X | X |
| | SCSI ITL NEXUS 3 | SCSI PROTOCOL | | X | |
| | | DISK ADAPTER DD | | X | |
| | | DISK ADAPTER | X | X | |
| | | DISK | X | X | X |

FIG. 1
(PRIOR ART)

2

METHOD AND SYSTEM PROVIDING EXTENDED AND END-TO-END DATA INTEGRITY THROUGH DATABASE AND OTHER SYSTEM LAYERS

CROSS REFERENCE TO RELATED APPLICATIONS

The present application is related to U.S. patent application Ser. No. 11/381,767, filed May 5, 2006, and entitled, "Method and Apparatus for Maintaining Data Integrity When Switching Between Different Data Protection Methods", and assigned to the assignee of the present application.

FIELD OF THE INVENTION

The present invention relates to data integrity in computer systems, and more particularly to providing data integrity through functional layers above and including that of a database system.

BACKGROUND OF THE INVENTION

Recent studies have found that a large percentage of new information is stored on magnetic storage media as opposed to other forms of storage. In addition, a growth of at least 30% of new information has been recently estimated for each new year. Information can be stored in file systems, on magnetic tape, and in databases. The most critical of information, such as stock market information, medical information, and financial information, is likely to be stored in databases which in turn store information in file systems. The file systems, in turn, are stored on permanent physical media such as a disk device.

One large challenge to storing information electronically is that there are many layers between the end user and the underlying physical media that stores the data. The physical media can cause corruption in data that is stored, and so can any of the layers between a user and physical media, including but not limited to the database server itself. For example, data can be corrupted in system memory from a memory error, in a disk device or controller from hardware or driver errors, or from other errors in an operating system, program, or utility on any system in a solution. Such corruption can cause inaccurate data to be sent to, retrieved from, and/or stored on the physical media.

There are many possible layers in a "solution stack" (all the layers of a system from an application to physical storage, including an I/O stack), including such layers as the application layer, server operating system layer, file system layer, interface protocol layer, peripheral driver layer, hardware/software controller layer, and disk layer. Some methods exist for preventing corruption in data provided to some of the layers in an I/O stack. However, some of the layers in a system are not addressed by existing methods of maintaining data integrity. There are industry standards such as T10 and proprietary implementations that aim to catch and correct data corruption in the I/O stack, but none link the actual database with the other higher layers in the solution such as an application layer. Database systems are the primary storage interface for the vast majority of critically important information. If the database or earlier layer corrupts the data, all of the data protection "below" the database (down to the physical storage media) will not detect or prevent the data corruption.

Accordingly, what is needed is a method and apparatus that extends data integrity and the detection of data corruption in an I/O stack up through a database layer and other system layers to the application end. The present invention addresses such a need.

SUMMARY OF THE INVENTION

The invention of the present application relates to extending data integrity from the layers of a database to the layers above in a solution. In one aspect of the invention, a method for providing data integrity in a system including a database includes determining that information is to be transmitted between an application end of the system and a physical storage medium that stores the information for a database of the system, the information to be transmitted via a database server in a database server layer of the database system. At least a portion of data protection is provided for the information, the data protection causing the information to be protected from corruption between a system layer and the physical storage medium, where the system layer is a separate layer provided closer to the application end of the system than the database server layer.

In another aspect of the invention, a system for providing data integrity for a database includes a system layer, such as a client or middleware layer, sending and receiving information to and from the database and validating the information using a first data protection mechanism. A database server is provided in a database server layer and is provided further from an application end of the system than the system layer. The database server sends and receives the information to and from the system layer and to and from a physical storage medium that stores data for the database. The database server links the first data protection mechanism to a second data protection mechanism provided between the database server and the physical storage medium such that the information is protected from corruption between the system layer and the physical storage medium.

The present invention allows extended data integrity to be implemented for computer systems such as computer systems including database systems, and allows end-to-end data integrity in the system. This allows information input by a user or other source to be validated at layers of the system above a database layer, thus preventing processing and storage of data corrupted at these layers.

BRIEF DESCRIPTION OF THE FIGS.

Figure 3:
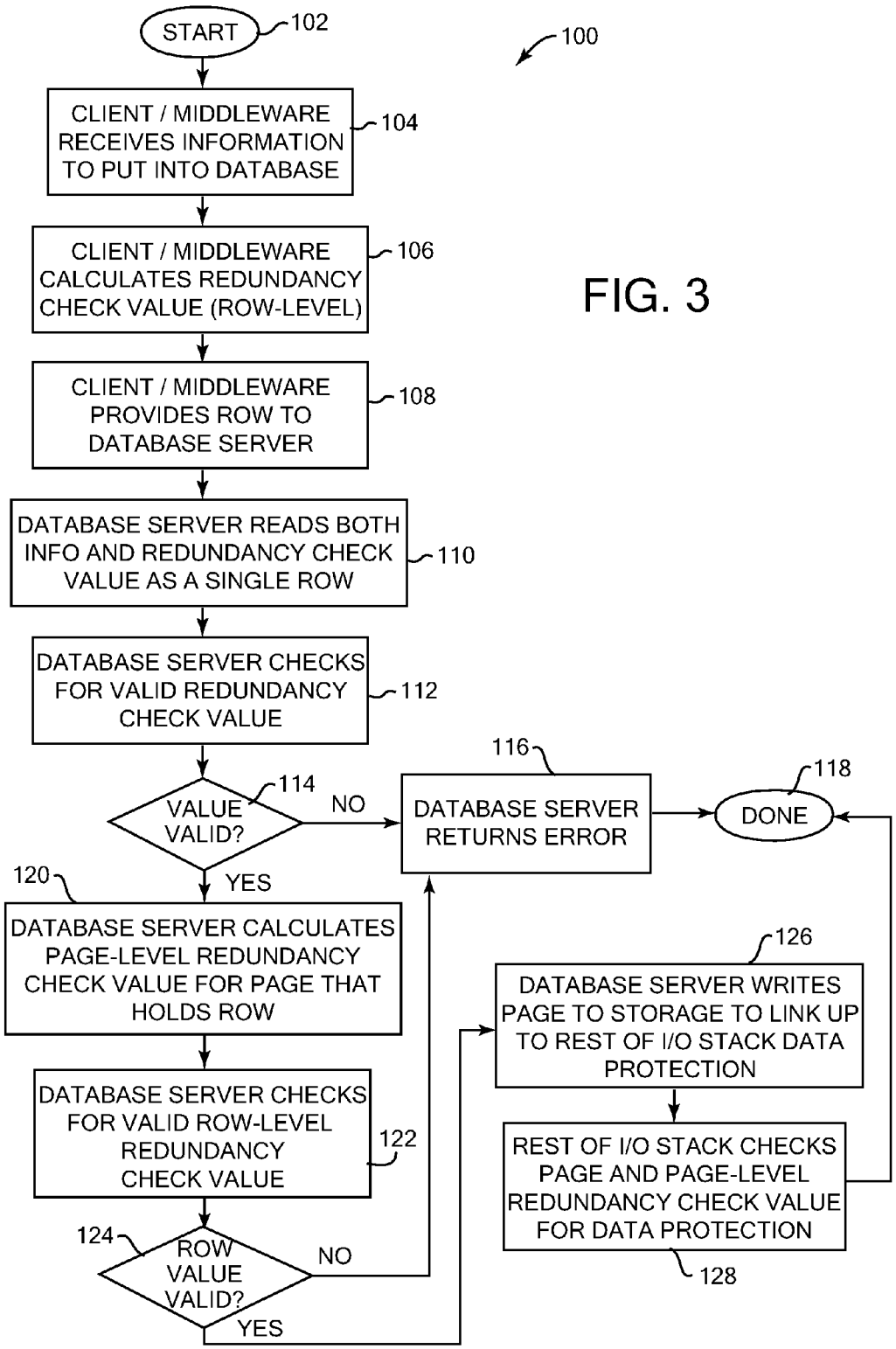
Figure 4:
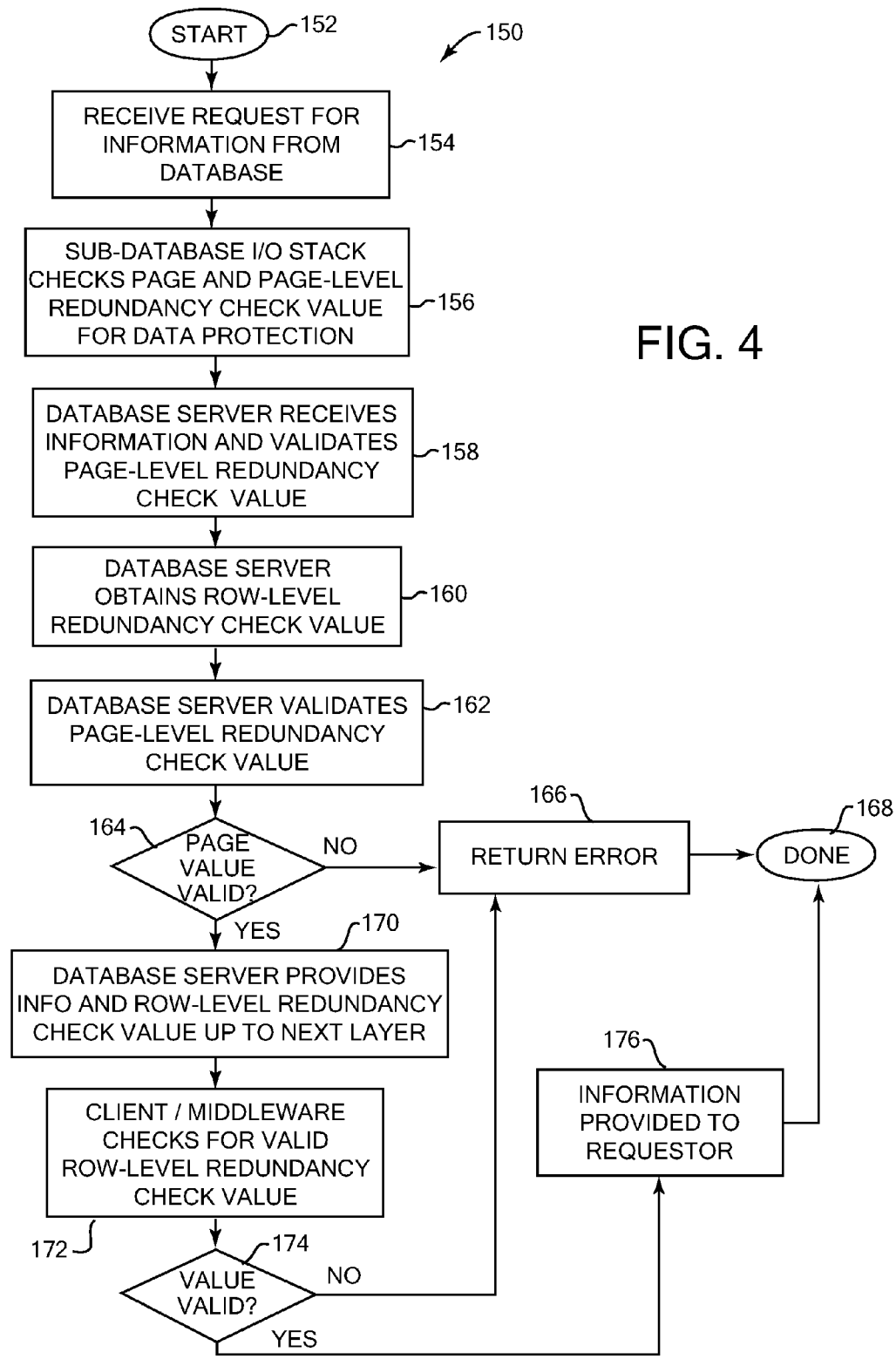

FIGS. 1 is a diagrammatic illustration of a table that shows layers in a theoretical existing I/O stack of a computer system and possible data corruption types;

FIG. 2 is a diagrammatic illustration of a system including several example functional layers in a solution stack suitable for use with the present invention; and FIG. 3 is a flow diagram illustrating one embodiment of a method of the present invention for providing data integrity when storing information to a database; and FIG. 4 is a flow diagram illustrating one embodiment of a method of the present invention for providing data integrity when retrieving information from a database.

DETAILED DESCRIPTION

The present invention relates to data integrity in computer systems, and more particularly to providing data integrity through functional layers above and including that of a database system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is mainly described in terms of particular systems provided in particular implementations. However, one of ordinary skill in the art will readily recognize that this method and system will operate effectively in other implementations. For example, the system implementations usable with the present invention can take a number of different forms. The present invention will also be described in the context of particular methods having certain steps. However, the method and system operate effectively for other methods having different and/or additional steps not inconsistent with the present invention.

The invention can take the form of an entirely hardware embodiment, an entirely software embodiment or an embodiment containing both hardware and software elements. A software embodiment can include but is not limited to firmware, resident software, microcode, etc. Furthermore, the invention can take the form of program instructions or code stored by a computer-readable medium for use by or in connection with a computer or any instruction execution system. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk (e.g., CD-ROM, DVD, etc.).

To more particularly describe the features of the present invention, please refer to FIGS. 1-4 in conjunction with the discussion below.

FIG. 1 is a diagrammatic illustration of a table 10 that shows layers in a theoretical existing I/O stack of a computer system and possible data corruption types at different layers. As shown, there are many possible functional layers in an I/O stack, including other layers not shown in table 10. In a database system, each layer can potentially be involved with one or more corruption types, including block corruption, address corruption, and data loss. The data loss type indicates that it is not possible to retrieve previously stored data, since the stored data itself is not written to storage (on a physical disk, for example).

FIG. 2 is a diagrammatic illustration of a system 20 or other electronic system or device including several example functional system layers in an I/O stack suitable for use with the present invention. The example of system 20 is a solution including a database, and including relevant layers, but many other embodiments of computer systems are suitable for the present invention, including systems having more or less layers. The layers of the system 20 as described below are described generally, and can include one or more layers within them. The layers can be combined into different, larger layers in other embodiments. Herein, the term "system layer" is used to generally refer to any layer in a solution or other system. The layers of the system 20 can be implemented on well-known system hardware, including one or more microprocessors, memory (RAM, ROM, Flash memory, etc.), and various peripherals including storage devices (hard disk, optical storage such as DVD-ROM and CD-ROM), input devices (keyboards, pointing devices), output devices (monitors, printers) communication devices and networking devices, etc.

System 20 includes client layers 22, which are at the top layer of the system 20, i.e., at the "application end" of the system 20 where a user or system can submit data to be stored in the database or request data from the database. Herein, a human user or any program or device submitting or requesting information are all referred to as a "user." The client layers 22 can include one or more layers that provide different software programs, such as one or more user interfaces, and applications running beneath the user interfaces, and/or other services programs. These different programs can be provided on different client layers. For example, in a system allowing a user to interface with various applications, one or more user interfaces are included in layer 22 above the applications. A user interface can be implemented in any of a variety of ways, such as part of an application and on the same layer as the application, or on its own layer as a generic interface like a web browser. Applications which utilize the user interface can receive input from the user. For example, in an embodiment providing an automated teller machine (ATM) to a user, the user interface can receive numerical values from the user specifying monetary amounts for deposit or withdrawal to and from a bank service, where the user's account information is stored and implemented on the system 20. The application on the client layer 22 can determine how the numerical values are to be manipulated and stored.

Middleware layers 24 are provided below the client layer 22 and generally includes one or more layers of middleware software. Layer 24 can include one or more intermediate software layers which mediate interaction between parts of an application, between applications in client layers 22 and/or other systems, or between a client layer and a database layer. For example, middleware can perform connection pooling, cache database results, provide metadata for applications, facilitate multiple processes running on the system 20 and other systems to interact across a network, etc. In the ATM example above, the middleware layer 24 can include programs which direct values between the user interacting with one or more applications via a user interface at client layer 22, and a database server of the system 20. In some embodiments, middleware layer 24 is not included in the system 20.

Database server layer(s) 26 includes the software for the database server that provides database services to the client(s) at layer 22 and to other applicable programs. Any type or version of database server software can be provided. For example, the software for a database management service (DBMS) such as DB2 can be provided at layer 26. The layer 26 can receive requests and data from the middleware layer 24 and/or client layer 22, and can provide results for the requests to the layers 24 and/or 22 based on data stored in the database in communication with the database server at layer 26.

Operating system layer 28 is one example of a layer below the database server layer 26. The operating system manages the operation of various functions and capabilities of the system 20, including the running of software on layers above the layer 28. The operating system can interface the software of the layers above layer 28 with hardware devices of the system, such as physical storage devices used for storing data for the database including memory, hard disk, magnetic media, optical storage, and other storage.

Other layers 30 can be provided in system 20 as desired for particular embodiments. For example, such layers can include a file system, drivers, managers of devices, protocols, storage area network (SAN) layers, controllers, and other layers included in the table of FIG. 1, as well as other layers well known to those of skill in the art.

Physical media layer 32 is provided to physically store data for the database interfaced to by database server layer 26.

Layer 32 can include physical storage media such as magnetic hard disks and/or other long-term, "permanent" storage devices. The "database" of the system 20 thus is implemented using the physical media layer 32 and any other higher layers needed to store, retrieve, and organize data as controlled by the database server at layer 26. The physical storage media of the database, as referred to herein, are used for storing database information, not for information storage in temporary processing or operations.

The system 20 includes standard data integrity protection starting at the database layer 26 and extending down to the physical media layer 32. For example, the T10 standard and/or related efforts can be provided. Such data integrity protection can be implemented in a variety of ways as is well known to those of skill in the art. When used with the data integrity methods of the present invention, the data integrity protection in layers 26 to 32 can use a redundancy check, such as a checksum, cyclic redundancy check (CRC), or other method to protect the data, and that redundancy check should extend up to the database server layer 26.

In one example, consider the following insert statements which insert data into the database:

db2 connect to sample
    db2 insert into staff values (14, 'Wolfrum', 20, 'Sales', 6, 62000, 13000)
    db2 insert into staff values (15, 'Cerny', 20, 'Sales', 8, 63000, 12000)
    db2 insert into staff values (16, 'Kit', 20, 'Sales', 5, 52000, 10000)
    db2 connect reset In theory, the information to be stored by an application or middleware can be corrupted by the time those rows are stored in the database server. Likewise, information retrived from a database can be corrupted by the time the client application or middleware receives the information. In existing implementations, the software at the client and/or middleware layers 22 and 24 have no way to detect corrupted and incorrect information. Such detection at layers 22 and 24 can be implemented by having a client or middleware store a redundancy check value for every row (and/or column) outside of the database. However, given that databases can have billions of rows of information and that there can be hundreds or thousands of distributed clients and/or middleware connections, this method is impractical.

FIG. 3 is a flow diagram illustrating one embodiment of a method 100 of the present invention for providing end-to-end data integrity by extending data integrity in an I/O stack up through a system to layers above the database. Method 100 describes writing information to the database using the data protection of the present invention. The methods described herein can be implemented in hardware, software, or a combination of both hardware and software. Method 100 can also be implemented using program instructions provided on a computer readable medium, such as memory, magnetic tape, a magnetic disk, optical disk, etc.

The present invention provides end-to-end data protection, from the application end of the system to the physical media end. In one described embodiment, a new virtual redundancy check column is defined for a database table to provide a row-level redundancy check, which is linked with the data protection mechanism of the underlying I/O stack (database layer(s) and lower), such as a page-level redundancy check. The data protection redundancy check values are stored in the database using the underlying data protection mechanisms while still providing clients and middleware with the ability to check data integrity of all information retrieved from the database and provided to the database for storage. The purpose is to protect the data from corruption between the database and client application or middleware.

The method begins at 102, and in step 104, a client or middleware receives information to store in the database (e.g., an insert or update in the database). For example, this information can be in the form of several values, or in the form of a database language statement provided by a user, or in some other form. The information includes one or more values of data that is to be stored in a row of the database.

In embodiments that include both client layer(s) and middleware layer(s), the topmost client (closest to the application end) receives this information and performs the appropriate steps of the present invention for data protection (e.g., step 106 described below); the layer that creates the data or receives the data or measures the data to be inserted into the database first calculates the redundancy check. All the other lower client and/or middleware layers can receive the information and data protection in turn and validate the information using the data protection similarly to the database server as described below in steps 112 and 114 (checked against the actual data), so as to not break the end-to-end data protection of the present invention. At the database layer it is checked by the database before the data is inserted, as described below. If an error is detected by any of these layers before the database layer, that layer can inform the user and/or the database server of the error, and/or that layer can retry the error check, etc.

In step 106, the client or middleware calculates a redundancy check value for the information. The redundancy check value can be a standard checksum, cyclic redundancy check (CRC), or other form of redundancy check value or similar data protection; any of various known ways for determining such a value can be used. In step 108, the client or middleware provides a row to the database server (e.g., stores the row in memory to be accessed by the database server and sends the row over a network using a protocol such as TCP/IP, and/or other method). This row includes the information to put in the database as well as the redundancy check value determined in step 106. Thus, in the described embodiment the client or middleware can provide an added "virtual column" of the redundancy check values as an extension to the rows of information to be stored in the database. This row-level data protection in the virtual column can be referred to as application data protection, which is a data protection mechanism that occurs at the application end to the database server layer, before other existing data protections at the database layer to the physical media layer (or equivalent level to the database level in non-database systems and solutions). A standard database interface such as Structured Query Language (SQL) can be used to provide the row to the database server at the database server layer 26. In other embodiments, other interfaces can be used, e.g., XQuery and XPATH for XML databases.

In step 110, the database server reads (e.g., from memory or a network or other storage) both the information and the redundancy check value as a single row. In step 112, the database server checks for a valid (row-level) redundancy check value in the received row. For example, if a checksum or CRC were used as the data protection, the database server performs the checksum or CRC operation on the actual data to be inserted/updated and compares the result to the checksum or CRC provided in the virtual column for the row. In step 114, the database server determines whether the redundancy check value in the row is valid, where the calculated redundancy check value is valid if it matches the redundancy check value from the virtual column. For example, if a calculated checksum or CRC matches the value in the row, then the value in the row is considered valid, and if the calculated result does not match the value in the row, the value in the row is considered invalid. If invalid, in step 116 the database returns an error to the middleware and/or client, and the information is discarded as invalid and not written to the database. The process is then complete at 118.

If the redundancy check value is found to be valid in step 114, then in step 120 the database server determines a redundancy check based on an established error checking method or mechanism used by the I/O stack at the database server and/or below layers. In the example embodiment shown in FIG. 3, a page level redundancy check mechanism is used (which provides a different value than the row-level redundancy check value determined by step 106). In such an embodiment, the database server calculates a page-level redundancy check value for the entire page of the database that will store the row, such as a checksum or CRC. This page will store the received row as well as currently storing other rows of the database that include other data. A database "page," as referred to herein, is a collection of one or more database rows (each row can have a different size), where the page has a constant size in storage capacity (e.g. in bytes), such that each page holds the same amount of information to make the management and updating of underlying database data more practical. Thus the redundancy check value of step 120 is determined based on all the information on the database page, including the newly received row and any other existing rows. This page-level data protection is a data protection mechanism used for the database layer and lower layers of the I/O stack. In some embodiments, to improve performance, when an UPDATE operation is to be performed for the received information to update an existing row of the database (as opposed to an INSERT operation to insert a new row), the database server may undo the impact of the previous row (that is to be updated) on the page-level redundancy check value and apply the impact of the new row to the page-level redundancy check value, rather than calculating an entirely new value for the page.

In step 122, the database server re-checks for a valid row-level redundancy check value in the received row, e.g., by comparing a newly-calculated redundancy check value to the redundancy check value provided in the virtual column of the received row. (In some embodiments, for extra security, an additional page-level redundancy check can also be performed here.) The row level validation follows the page-level redundancy check value determination of step 120 and this overlap ensures that the original row has not been corrupted and the protection chain is not broken. Such data corruption can occur during the page-level value calculation or other steps described above. In step 124, it is determined whether the row-level redundancy check value is valid based on the check of step 122. If it is not valid, the database server returns an error and discards the received information and all calculated values and does not write the information to the database, and the process is complete at 118.

If the row-level check value is valid in step 124, then in step 126 the database server can write the page, including the page-level redundancy check value, to storage such as a file structure or other storage structure of the database. This writing operation provides the page and value to the next layer in the I/O stack below the database server, and links up the data protection to the rest of standard I/O stack data protection, which is assumed to already exist for the database server layer down to the physical media layer 32. In step 128, the remaining part of the I/O stack (below the database server layer) checks the page and the page-level redundancy check value as appropriate for its own data protection mechanism, as is known in the art, so that the page is eventually permanently stored (for long-term storage) on the physical media such as a hard disk at the physical media layer 32. Once the page-level redundancy check value is determined and used as described above, this same value can be checked by all or some of the remaining layers in the I/O stack, e.g., if these remaining layers use a data protection scheme that utilizes a page-level redundancy check. If any of the remaining layers do not use the same redundancy check, they can use their own data protection schemes by translating the page-level redundancy check to their appropriate data protection format, and overlap their own data protection with the error check used from the layer above, e.g., follow their own check with the page-level check described above. Thus, each layer in the 1/0 stack can either follow the same protection mechanism as the layer(s) above or it can switch to another known preferred method and overlap the checks to ensure the protection chain is not broken. Some examples of maintaining data integrity when switching between different data protection methods which can be used in step 128, are described in U.S. patent application Ser. No. 11/381,767, incorporated herein by reference. The process is then complete at 118.

In other embodiments, other methods can be used to provide data protection according to the present invention. For example, other known data protection methods can be used from the database level to the physical media instead of the page-level protection described above. This other data protection method is overlapped with the row-level redundancy check of the present invention similarly as described above, to ensure the chain of data protection is unbroken.

Thus, the row-level redundancy check value provided by the client or middleware protects the received information between the client or middleware and the page-level redundancy check (or other type or variation of data protection) performed at the database server layer. This row-level redundancy check value also validates the information is correct after the page-level redundancy check value (or other error check at the database layer) is determined, ensuring that corruption of the information has not occurred during processing. The virtual column that stores redundancy check values is thus closely linked with the underlying data protection mechanisms. The result is solution-level (as opposed to product-level or component-level), end-to-end data protection for a solution involving a database.

The virtual column storing the row-level redundancy check values is not necessarily a real column stored in the database. Storing the values in the physical media (for long-term storage) for small rows can in some embodiments greatly increase the storage overhead of this data protection. In some embodiments, each value only protects a complete row and would not be usable for select statements that return a sub-set of a row's columns. Thus, in some embodiments the virtual column can be temporarily stored in memory during the transmission of the information between layers to allow the data protection, and then discarded when the information has been safely stored in the database. In other embodiments, a row-level redundancy check value can pertain to a sub-set of a row's columns as well. For example, the database can calculate the redundancy check for a subset of the row's columns and return data as appropriate.

In other embodiments, the row-level redundancy check values can be stored in the physical storage media of the database. Some embodiments can write the row-level values in the database as the virtual column described above (not data that can be requested by a user, but used as metadata for its associated row). Other embodiments can organize the row-level values differently, such as in a separate meta-table or shadow table that refers to the associated rows, or in a different structure.

FIG. 4 is a flow diagram illustrating one embodiment of a method 150 of the present invention for providing end-to-end data integrity, in which information is retrieved from the database using the data protection of the present invention.

The method starts at 152, and in step 154, a request is received for information from the database. For example, a SELECT statement can be used in a DB2 environment to retrieve information from selected rows of the database. The request can take other forms in other embodiments; for example, it may be a simpler request from a user that is later translated into a database statement by a client application, by middleware, etc.

In step 156, the I/O stack layers below the database check the row(s) storing the requested information to ensure data protection for the requested information. As in method 100 of FIG. 3, these I/O stack layers can use their own appropriate data protection. For example, in the described embodiment, the page storing the requested rows is checked, including determining a page-level redundancy check value for the page. As in method 100, these layers can use their own appropriate data protection as known in the art, overlapped with an error checking method used by the previous (lower layer) providing the data. In step 158, the database server receives the information and the (for example) page-level redundancy check value and validates the page-level value (or other used error check value) to make sure the information is valid.

In step 160, the database server obtains the row-level redundancy check value that is associated with the requested information. In some embodiments, the database server can calculate the row-level redundancy check value in step 160, based on the requested information itself (which is stored in a row). In other embodiments, the database server can retrieve the associated row-level redundancy check value from storage such as the physical storage media layer 32 or other storage (e.g., the database could store a redundancy check for each full row, or page, or disk sector or some other mechanism). In step 162, the database server re-validates the page-level redundancy check value This overlap of validations ensures that no corruption has occurred in the information during processing and that the protection chain has not been broken. In step 164, if it is determined that the page-level value is not valid, the client/middleware informs the user and/or the database server of an error in step 166 indicating that the data is corrupted (and/or some other measure is taken, e.g., a re-try of the redundancy checks or other action), and the process is complete at 168.

If the page-level value is valid in step 164, then in step 170 the database server provides the requested information and the row-level redundancy check value up to the next layer in the system, which in many embodiments is a client or middleware layer. In step 172, that client or middleware (or other) layer checks whether the received row-level redundancy check value is valid. In step 174, if the value is not found to be valid, then the middleware/client returns an error to the user in step 166 and the process is complete at 168. If the value is found to be valid in step 174, then, after each succeeding middleware and/or client layer has validated the information in a similar way, the topmost layer provides the information to the requestor at step 176, and the process is complete at 168.

In embodiments where the row-level virtual column is not physically stored in the database, the row-level redundancy check value is re-calculated by the database server for those rows being retrieved and returned. In other words, the virtual column only protects the rows/columns being returned. This is all that is required since the purpose of the row-level redundancy check is to protect the information as it is transmitted from the database server layer up to the client/middleware layers (the page-level data protection still protects the rest of the page as it is stored in the physical media layer).

EXAMPLE EMBODIMENTS

There are many possible specific implementations of the invention. The particular examples described below are not intended to be limiting, and there are many other ways to implement the inventive features described herein.

In one example, a new INSERT command can be used to implement features of the invention. An example in SQL is shown below.

db2 connect to sample
db2 insertx into staff values (14, 'Wolfrum', 20, 'Sales', 6, 62000, 13000, 0x198753)
db2 insertx into staff values (15, 'Cemy', 20, 'Sales', 8, 63000, 12000, 0x23525)
db2 insertx into staff values (16, 'Kit', 20, 'Sales', 5, 52000, 10000, 0x213423)
db2 connect reset In the example above, each of the "insertx" statements is different from a standard "insert" statement in that it includes a redundancy check value provided at the end of the data, which in this example is a checksum value. The checksum can be stored in a virtual column that extends each of the rows formed by the other data in these statements (each checksum is stored in a row by the client or middleware, e.g. in memory, not the physical media of the database). Other similar specialized statements, such as "selectx" and "updatex" statements, can also be provided and similarly include a redundancy check value determined by the client or middleware, where the specialized statements are received and used by the database server. One benefit of this implementation is that standard "insert," "update," and "delete" statements can remain unchanged and still be received and used in the database system (without benefiting from the data protection of the present invention), so that applications could be ported over as needed. Also, the client or middleware can calculate the redundancy check value directly in its own code to ensure that data protection is extended right from within the client or middleware, through the database server, and down to the physical media. In other embodiments, a table or entire database can be defined in such a way that it always has a virtual column to hold a redundancy check value for every table.

In some embodiments, the redundancy check values can be checked in a separate layer, within the client enablement code. In such an embodiment, the redundancy check value can be calculated and checked for all received statements, and the underlying application or program can remain unchanged. One drawback to this implementation is that the client or middleware would still be at risk of encountering undetected corruption between the layer that calculates and validates the redundancy check value in the client enablement code and the actual client or middleware code layer. In other embodiments the redundancy check value is calculated and validated in the actual client and middleware code (and in the actual database server code, before it is sent to the client/middleware layer), so that the data protection mechanism extends right into the client or middleware from the database server.

Some embodiments of the invention can allow a client or middleware layer program, or an independent data integrity checking program, to periodically select from various tables of the database and validate the information in the database at the client layer (and middleware) layers, rather than just at the database server layer. For example, each day, week, or other desired period, information can be retrieved and checked for validity, which can indicate whether there are any errors in the database server itself or other higher layers, rather than just at the storage level of the information.

In some embodiments, a more complex and complete type of data integrity checking can include support for complex SQL statements such as joins, GROUP BY, and aggregation functions (e.g., SUM). For example, the statement db2 "select lastname, SUM(salary) from employee group by lastname"

can return the following columns: the unique last name, the sum of all salaries grouped by lastname, and the checksum (or other redundancy check value) of the returned columns (in this case, the unique last names and the sum of the salaries for each unique last name).

So that the protection functions correctly, the redundancy check value can cover both the last names and the aggregated salaries. The lastnames are simple since no operator is run on them. However, the sum of the salaries does involve an operator (SUM). Some embodiments can run the redundancy check value through the same operator. In this example, the checksums can be SUMed in the same way as the salaries for each unique last name. Other methods can be used to provide a relevant redundancy check value for complex statements and data operations in other embodiments. Similar but more complex SQL statements can be provided in other embodiments using the data protection of the present invention.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A computed-implemented method for providing data integrity in a system including a database, the method comprising:
   determining that information is to be transmitted between an application end of the system and a physical storage medium that stores the information for a database of the system, the information to be transmitted via a database server in a database server layer of the system; and
   providing at least a portion of data protection for the information, wherein the data protection protects the information from corruption between a system layer and the physical storage medium, wherein the system layer is a separate layer provided closer to the application end of the system than the database server layer, and wherein providing at least a portion of data protection includes using a first data protection mechanism for layers of the system between the application end of the system and the database server layer and linking the first data protection mechanism with a second data protection mechanism different from the first data protection mechanism, the second data protection mechanism being used for layers of the system between the database server layer and the physical storage medium.

2. The method of claim 1 wherein the first data protection mechanism includes using a first redundancy check value, and wherein the second data protection mechanism includes using a second redundancy check value.

3. The method of claim 2 wherein the first redundancy check value is a row-level redundancy check value associated with a created row that holds the information, and wherein the second redundancy check value is a page-level redundancy check value associated with a page of the database that includes the created row.

4. The method of claim 2 wherein at least one of the redundancy check values includes one of a checksum and a result of a cyclic redundancy check (CRC).

5. The method of claim 1 wherein the information is received at the application end of the system to be stored in the database on the physical storage medium.

6. The method of claim 5 wherein providing at least a portion of data protection includes determining a row-level redundancy check value at the system layer and passing the redundancy check value with the information such that the database server receives the redundancy check value and the information, the information to be stored in a row.

7. The method of claim 6 wherein the database server validates the row-level redundancy check value, and then determines a page-level redundancy check value associated with a page of the database that includes the row, and wherein the database server re-validates the row-level redundancy check value after determining the page-level redundancy check value.

8. The method of claim 1 wherein the information is retrieved from the physical storage medium and provided to the application end of the system.

9. The method of claim 8 wherein providing at least a portion of data protection includes the database server providing a redundancy check value to the system layer with the information and the system layer validating the information using the redundancy check value.

10. The method of claim 9 wherein the redundancy check value provided to the system layer is a second redundancy check value, and wherein the database server, before providing the second redundancy check value and information to the system layer, validates a first redundancy check value received from an I/O stack layer provided below the database server layer in the system, subsequently obtains the second redundancy check value associated with the information, and subsequently re-validates the first redundancy check value.

11. The method of claim 1 wherein the system layer is a client layer of the system.

12. The method of claim 1 wherein the system layer is a middleware layer of the system, the middleware layer being provided between a client layer of the system and the database server layer.

13. The method of claim 1 wherein providing at least a portion of data protection includes providing a redundancy check value from the system layer to a database layer using a database language statement.

14. A computer readable storage medium storing program instructions to be executed by a computer and for providing data integrity in a system including a database, the program instructions performing steps comprising:
   determining that information is to be transmitted between an application end of the system and a physical storage medium that stores the information for a database of the system, the information to be transmitted via a database server in a database server layer of the system; and
   providing at least a portion of data protection for the information, wherein the data protection protects the information from corruption between a system layer and the physical storage medium, wherein the system layer is a separate layer provided closer to the application end of the system than the database server layer, and wherein providing at least a portion of data protection includes using a first data protection mechanism for layers of the system between the application end of the system and the database server layer and linking the first data protection mechanism with a second data protection mechanism different from the first data protection mechanism, the second data protection mechanism being used for layers of the system between the database server layer and the physical storage medium.

15. The computer readable storage medium of claim 14 wherein the first data protection mechanism includes using a first redundancy check value, and wherein the second data protection mechanism includes using a second redundancy check value.

16. The computer readable storage medium of claim 15 wherein the first redundancy check value is a row-level redundancy check value associated with a created row that holds the information, and wherein the second redundancy check value is a page-level redundancy check value associated with a page of the database that includes the created row.

17. The computer readable storage medium of claim 14 wherein the information is received at the application end of the system to be stored in the database on the physical storage medium.

18. The computer readable storage medium of claim 17 wherein providing at least a portion of data protection includes determining a row-level redundancy check value at the system layer and passing the redundancy check value with the information such that the database server receives the redundancy check value and the information, the information to be stored in a row.

19. The computer readable storage medium of claim 18 wherein the database server validates the row-level redundancy check value, and then determines a page-level redundancy check value associated with a page of the database that includes the row, and wherein after determining the page-level redundancy check value the database server validates the row-level redundancy check value.

20. The computer readable storage medium of claim 14 wherein the information is retrieved from the physical storage medium and provided to the application end of the system.

21. The computer readable storage medium of claim 20 wherein providing at least a portion of data protection includes the database server providing a redundancy check value to the system layer with the information and the system layer validating the information using the redundancy check value.

22. A system for providing data integrity for a database, the system comprising:
    a system layer implemented on hardware of the system, the system layer being a client layer or middleware layer of the system sending and receiving information to and from the database and validating the information using a first data protection mechanism for layers of the system between an application end of the system and a database server layer; and
    a database server in the database server layer provided further from the application end of the system than the system layer, wherein the database server sends and receives the information to and from the system layer and to and from a physical storage medium that stores data for the database, and wherein the database server links the first data protection mechanism to a second data protection mechanism used for layers of the system between the database server layer and the physical storage medium, the second data protection mechanism being different from the first data protection mechanism.

23. The system of claim 22 wherein the first data protection mechanism uses a first redundancy check value, and wherein the second data protection mechanism uses a second redundancy check value different from the first redundancy check value.

24. A computer readable storage medium storing program instructions to be executed by a computer and for providing data integrity in a system including a database, the program instructions performing steps comprising:
    determining that information is to be transmitted between an application end of the system and a physical storage medium that stores the information for a database of the system, the information to be transmitted via a database server in a database server layer of the system; and
    providing at least a portion of data protection for the information, wherein the data protection protects the information from corruption between a system layer and the physical storage medium, wherein the system layer is a separate layer provided closer to the application end of the system than the database server layer, and wherein providing at least a portion of data protection includes determining a row-level redundancy check value at the system layer and passing the row-level redundancy check value with the information such that the database server receives the row-level redundancy check value and the information, the information to be stored in a row.

25. The computer readable storage medium of claim 24, wherein the information is received at the application end of the system to be stored in the database on the physical storage medium.

* * * * *